United States Patent
Koll et al.

(10) Patent No.: US 9,082,408 B2
(45) Date of Patent: Jul. 14, 2015

(54) SPEECH RECOGNITION USING LOOSELY COUPLED COMPONENTS

(75) Inventors: Detlef Koll, Pittsburgh, PA (US); Michael Finke, Pittsburgh, PA (US)

(73) Assignee: MModal IP LLC, Franklin, TN (US)

( * ) Notice: Subject to any disclaimer, the term of this patent is extended or adjusted under 35 U.S.C. 154(b) by 365 days.

(21) Appl. No.: 13/491,856

(22) Filed: Jun. 8, 2012

(65) Prior Publication Data

US 2012/0316871 A1  Dec. 13, 2012

Related U.S. Application Data

(60) Provisional application No. 61/496,341, filed on Jun. 13, 2011.

(51) Int. Cl.
  *G10L 15/00* (2013.01)
  *G10L 15/30* (2013.01)
(52) U.S. Cl.
  CPC ...................................... *G10L 15/30* (2013.01)
(58) Field of Classification Search
  USPC .......................... 704/231, 246, 247, 251, 252
  See application file for complete search history.

(56) References Cited

U.S. PATENT DOCUMENTS

| | | | |
|---|---|---|---|
| 6,633,839 B2 | 10/2003 | Kushner | |
| 7,136,814 B1 | 11/2006 | McConnell | |
| 7,243,066 B2 | 7/2007 | Pearce | |
| 2004/0230637 A1 | 11/2004 | Lecoueche | |
| 2004/0236580 A1 * | 11/2004 | Bennett | 704/270.1 |
| 2007/0011010 A1 | 1/2007 | Dow | |
| 2008/0300878 A1 | 12/2008 | Bennett | |
| 2009/0030697 A1 * | 1/2009 | Cerra et al. | 704/275 |
| 2009/0097634 A1 * | 4/2009 | Nambiar et al. | 379/265.09 |
| 2010/0088100 A1 * | 4/2010 | Lindahl | 704/270.1 |
| 2011/0112836 A1 | 5/2011 | Kurki-Suonio | |

FOREIGN PATENT DOCUMENTS

WO  2009153788 A2  12/2009

OTHER PUBLICATIONS

"Nuance Releases Dragon NatuallySpeaking Version 11.5 and New Dragon Remote Mic App for Apple iOS," Retrieved Jun. 13, 2011, 4 pages. Available at: http://www.businesswire.com/news/home/20110613005495/en/Nuance/.

* cited by examiner

*Primary Examiner* — Leonard Saint Cyr
(74) *Attorney, Agent, or Firm* — Robert Plotkin, P.C.

(57) ABSTRACT

An automatic speech recognition system includes an audio capture component, a speech recognition processing component, and a result processing component which are distributed among two or more logical devices and/or two or more physical devices. In particular, the audio capture component may be located on a different logical device and/or physical device from the result processing component. For example, the audio capture component may be on a computer connected to a microphone into which a user speaks, while the result processing component may be on a terminal server which receives speech recognition results from a speech recognition processing server.

62 Claims, 10 Drawing Sheets

SPEECH RECOGNITION USING LOOSELY COUPLED COMPONENTS

CROSS-REFERENCE TO RELATED APPLICATIONS

This application claims priority from U.S. Provisional Patent Application Ser. No. 61/496,341, filed on Jun. 13, 2011, entitled, "Speech Recognition Using Loosely Coupled Components," which is hereby incorporated by reference herein.

BACKGROUND

A variety of automatic speech recognition (ASR) systems exist for recognizing speech to perform functions such as creating transcripts of the speech and controlling the operation of a computer. In one common configuration for such systems, a microphone is connected directly to a desktop computer or other computing device which executes automatic speech recognition software for recognizing the user's speech and acting on the results of that recognition. In another common configuration of such systems, the user makes a telephone call and speaks into a telephone, and an automatic speech recognition system remote from the user recognizes the user's speech and acts on the results of that recognition.

Recently a much wider variety of computing devices have become available having varying features and costs. For example, in addition to desktop and laptop computers (which typically must be connected to an external microphone, purchased separately, to capture speech), vendors now provide a wide variety of personal digital assistants (PDAs), smartphones, and tablet computers, all of which are capable of connecting to the Internet and other networks (often wirelessly), all of which are capable of executing custom applications to some extent, and some of which contain built-in microphones.

What is needed, therefore, are improved techniques for making use of a variety of computing technologies to provide automatic speech recognition capabilities that provide the right combination of recognition quality, recognition speed, and cost of ownership.

SUMMARY

An automatic speech recognition system includes an audio capture component, a speech recognition processing component, and a result processing component which are distributed among two or more logical devices and/or two or more physical devices. In particular, the audio capture component may be located on a different logical device and/or physical device from the result processing component. For example, the audio capture component may be on a computer connected to a microphone into which a user speaks, while the result processing component may be on a terminal server which receives speech recognition results from a speech recognition processing server.

In another embodiment, the audio capture component may be on the same logical device and/or physical device as the result processing component, but the effects of applying the speech recognition results may be output (e.g., displayed) to the user through a different logical device and/or physical device, such as a computer connected to a terminal server. In this embodiment, the end user experience is similar to that in which the audio capture component and/or result processing component are located on the user's computer, even though in fact neither such component is located on the user's computer.

In one embodiment, a system comprises: a first device including an audio capture component, the audio capture component comprising means for capturing an audio signal representing speech of a user to produce a captured audio signal; a speech recognition processing component comprising means for performing automatic speech recognition on the captured audio signal to produce speech recognition results; a second device including a result processing component; and a context sharing component comprising: means for determining that the result processing component is associated with a current context of the user; wherein the result processing component comprises means for processing the speech recognition results to produce result output.

In another embodiment, a method is performed by at least one processor executing computer program instructions stored on a non-transitory computer-readable medium. The method is for use with a system, wherein the system comprises: a first device including an audio capture component; a speech recognition processing component; and a second device including a result processing component. The method comprises: (A) using the audio capture component to capture an audio signal representing speech of a user to produce a captured audio signal; (B) using the speech recognition processing component to perform automatic speech recognition on the captured audio signal to produce speech recognition results; (C) determining that the result processing component is associated with a current context of the user; (D) in response to the determination that the result processing component is associated with the current context of the user, providing the speech recognition results to the result processing component; and (E) using the result processing component to process the speech recognition results to produce result output.

In another embodiment, a system comprises: an audio capture component, the audio capture component comprising means for capturing a first audio signal representing first speech of a user to produce a first captured audio signal; a speech recognition processing component comprising means for performing automatic speech recognition on the first captured audio signal to produce first speech recognition results; a first result processing component, the first result processing component comprising first means for processing the first speech recognition results to produce first result output; a second result processing component, the second result processing component comprising second means for processing the first speech recognition results to produce second result output; a context sharing component comprising means for identifying a first one of the first and second result processing components as being associated with a first context of the user at a first time; and speech recognition result provision means for providing the first speech recognition results to the identified first one of the first and second result processing components.

Other features and advantages of various aspects and embodiments of the present invention will become apparent from the following description and from the claims.

DETAILED DESCRIPTION

Figure 1A:
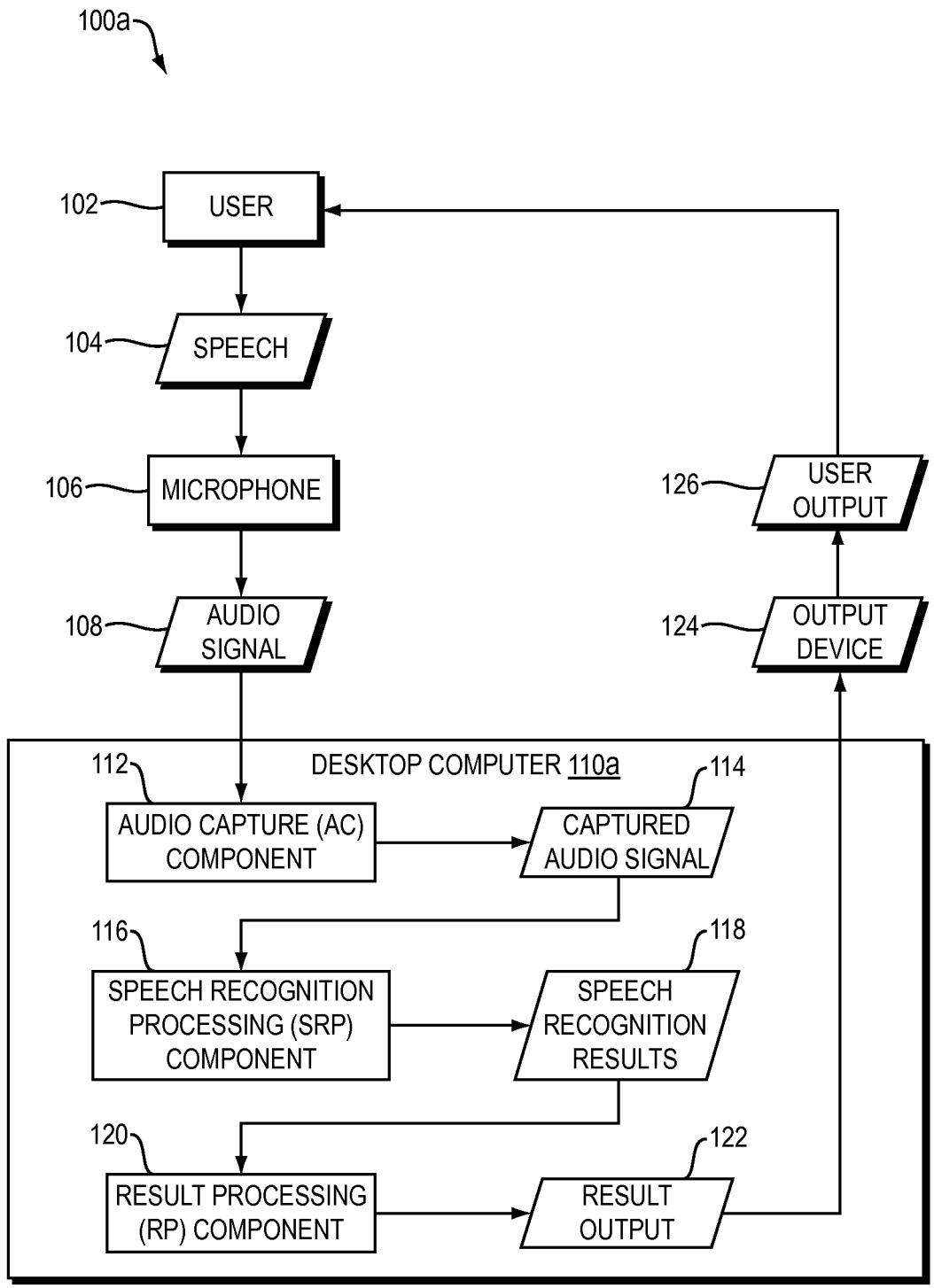
FIGS. 1A-1D are diagrams of prior art systems for performing automatic speech recognition.

Referring to FIG. 1A, an example of a prior art automatic speech recognition (ASR) system 100*a* is shown. The system 100*a* illustrates various features which are useful for understanding the characteristics and limitations of conventional ASR systems. For example, in the system 100*a*, a user 102 speaks into a microphone 106 that is connected to a desktop computer 110*a*. The microphone 106 is an example of an "audio capture device" as that term is used herein. The microphone 106 captures the user's speech 104 and generates as output an audio signal 108 representing the speech 104. The original audio signal will be referred to herein as the "original audio signal" to distinguish it from the captured audio signal 114 described below. The microphone 106 transmits the original audio signal 108 to the desktop computer 110*a*, such as over a wired or wireless connection.

Although the microphone 106 may be a dedicated external microphone, it may instead, for example, be contained within a digital voice recorder, cellular telephone, or other device containing one or more modules that are capable of performing functions other than capturing speech. In any such case, however, the microphone 106 transmits the original audio signal 108 to the desktop computer 110*a* for processing by the desktop computer 110*a*, as will now be described.

The desktop computer 110*a* includes an audio capture (AC) component 112 which receives the original audio signal 108. The audio capture component 112 may process the original audio signal 108 into a form suitable for transmission, such as by compressing and/or performing pre-processing on the original audio signal 108. The audio capture component 112 outputs a captured audio signal 114, which may be the same as the original audio signal 108, or which may differ from the original audio signal 108 if the audio captured component 112 applied any processing to the original audio signal 108.

The desktop computer 110*a* also includes a speech recognition processing (SRP) component 116. The audio capture component 112 transmits the captured audio signal 114 to the speech recognition processing component 116. Since, in the example shown in FIG. 1A, the audio capture component 112 and the speech recognition processing component 116 are on the same desktop computer 110*a*, the audio capture component 112 may, for example, transmit the captured audio signal 114 to the speech recognition processing component 116 using a local function call.

The speech recognition processing component 116 applies automatic speech recognition to the captured audio signal 114 and, as a result, produces speech recognition results 118. The results 118 may include, for example, the text of a dictated sentence recognized from the audio signal 114 (e.g., "the patient arrived complaining of headaches"), or a command (e.g., "close window" or "connect me with the operator") recognized from the audio signal 114.

The desktop computer 110*a* also includes a result processing (RP) component 120. The speech recognition processing component 116 transmits the speech recognition results 118 to the result processing component 120, which receives the speech recognition results 118 and takes appropriate action in response to the speech recognition results 118, thereby producing result output 122. An output device 124 connected to the desktop computer 110*a* may display output 126 to the user 102 which represents the result output 122.

Although not shown in FIG. 1A for ease of illustration, the result processing component 120 may provide the result output 122 to an application, such as a word processor, executing on the desktop computer 110*a*. For example, if the speech recognition results 118 are a sentence of text, the result processing component 120 may cause the word processor to insert such text into an open document at the current text cursor location. The output device 124 may then display the updated document as the user output 126. As another example, if the speech recognition results 118 are a command (e.g., "close window"), then the result processing component 120 may execute the command (such as by closing the foreground window), and the output device 124 may then provide an updated display in which the foreground window does not appear.

The audio capture component 112, speech recognition processing component 116, and result processing component 120 are all examples of "speech recognition components" as that term is used herein. Therefore any reference to a "speech recognition component" herein shall be understood to refer to one or more of an audio capture component, a speech recognition processing component, and a result processing component.

Although the computer 110*a* in the system 100*a* of FIG. 1A need not be a desktop computer, in many cases the computer 110*a* is a desktop computer with a relatively powerful processor and a relatively large amount of memory in order to meet the substantial computing resource requirements of the speech recognition processing component 116. Alternatively, for example, the speech recognition processing component 116 may be offloaded to a remote speech recognition server, as shown in the system 100*b* FIG. 1B.

Figure 1B:
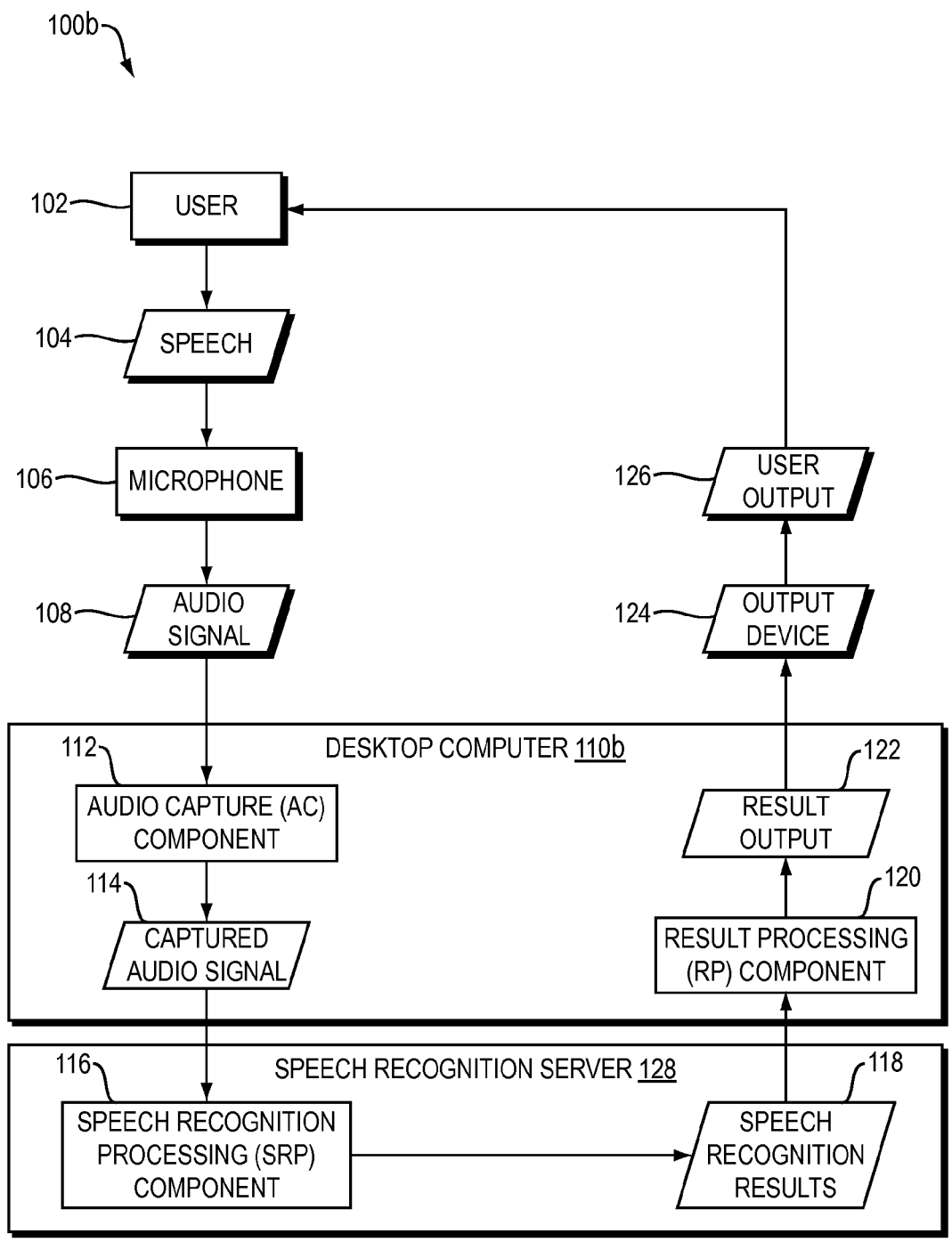
Figure 1C:
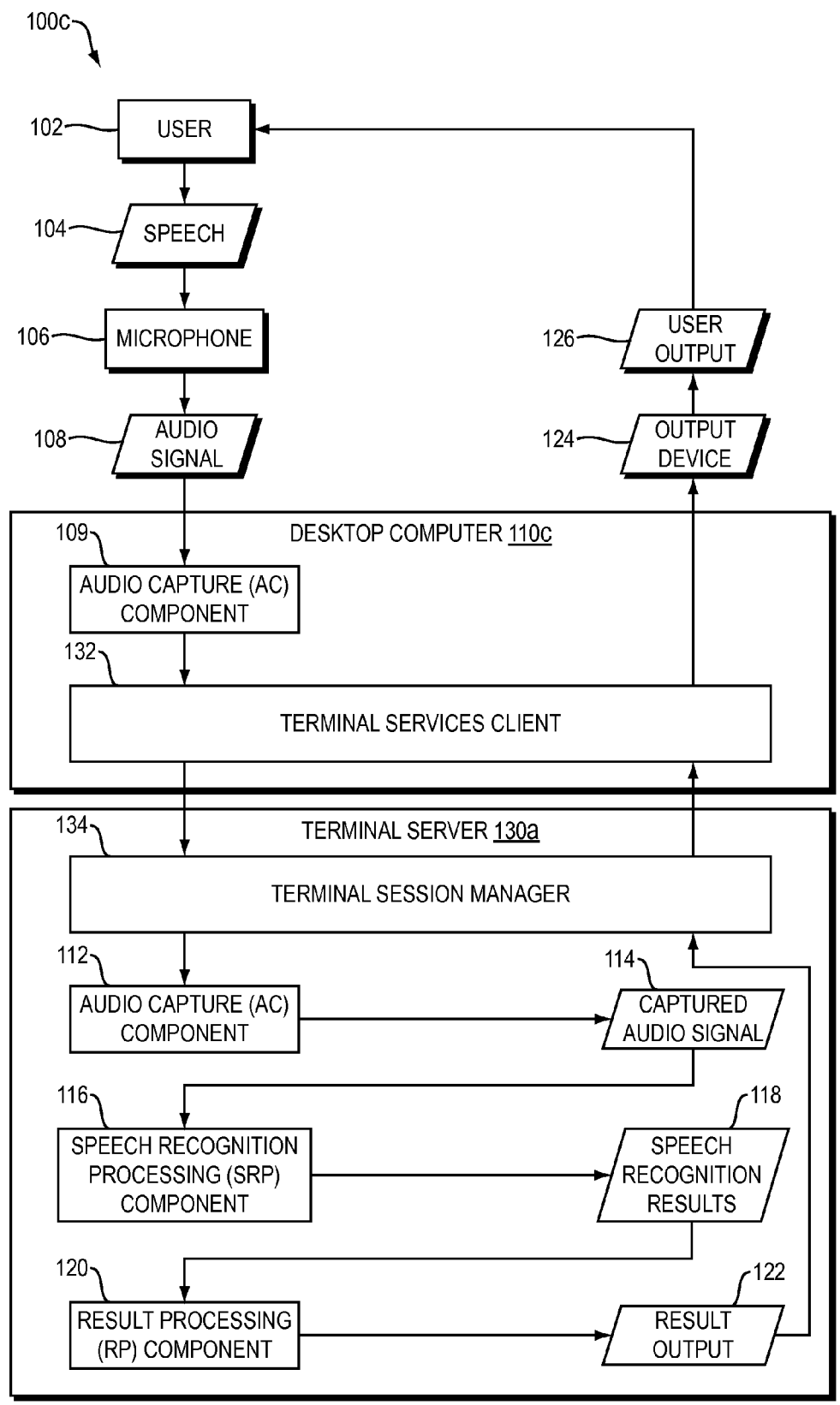

As yet another example, the microphone 106 (or other audio capture device) may be associated with a client session of a terminal server (such as a Citrix server), as shown in the system 100*c* of FIG. 1C. More specifically, in FIG. 1C, the desktop computer 100*c* no longer contains the speech recognition processing component 116 or the result processing component 120. Instead, although the desktop computer 110*c* contains an audio capture component 109 for at least partially capturing the audio signal 108, the terminal server 130*a* also contains both audio capture component 112 and speech recognition processing component 116 and result processing component 120.

The computer 110*c* in the system 100*c* of FIG. 1C now contains terminal viewer software 132 (such as Citrix client software) for establishing and maintaining a terminal session connection with the terminal server 130*a*. As a result, the terminal viewer software 132 essentially passes user input (such as the original audio signal 108) directly to a terminal session manager 134 on the terminal server 130*a*. The terminal session manager 134 then handles the input received from the terminal services client 132 appropriately, such as by forwarding the original audio signal 108 to the audio capture component 112. Similarly, the terminal session manager 134 transmits output (such as the result output 122) to the terminal services client 132, which in turn forwards the output to the appropriate output device connected to the desktop computer 110c (e.g., the output device).

From the perspective of the user 102, operation of the system 100c of FIG. 1C appears similar to that of the system 100a of FIG. 1A, even though in the components 112, 116, and 120 reside on the desktop computer 100a in FIG. 1A and on the terminal server 130a in FIG. 1C. In the configuration of FIG. 1C, the terminal services client 132 essentially acts as a two-way window into the terminal server 130a, such that the terminal server 130a performs all functions of the components 112, 116, and 118, but merely uses the terminal services client 132 on the desktop computer 110c to obtain input from the user 102 and to provide output to the user 102. Reasons for using the configuration of FIG. 1C include security (because loss, theft, or other comprise of the computer 110c does not comprise and applications and/or data on the server 130a) and processing efficiency (because a single high-powered terminal server can provide fast, high-quality speech recognition for many small, mobile, low-powered client computers).

Figure 1D:
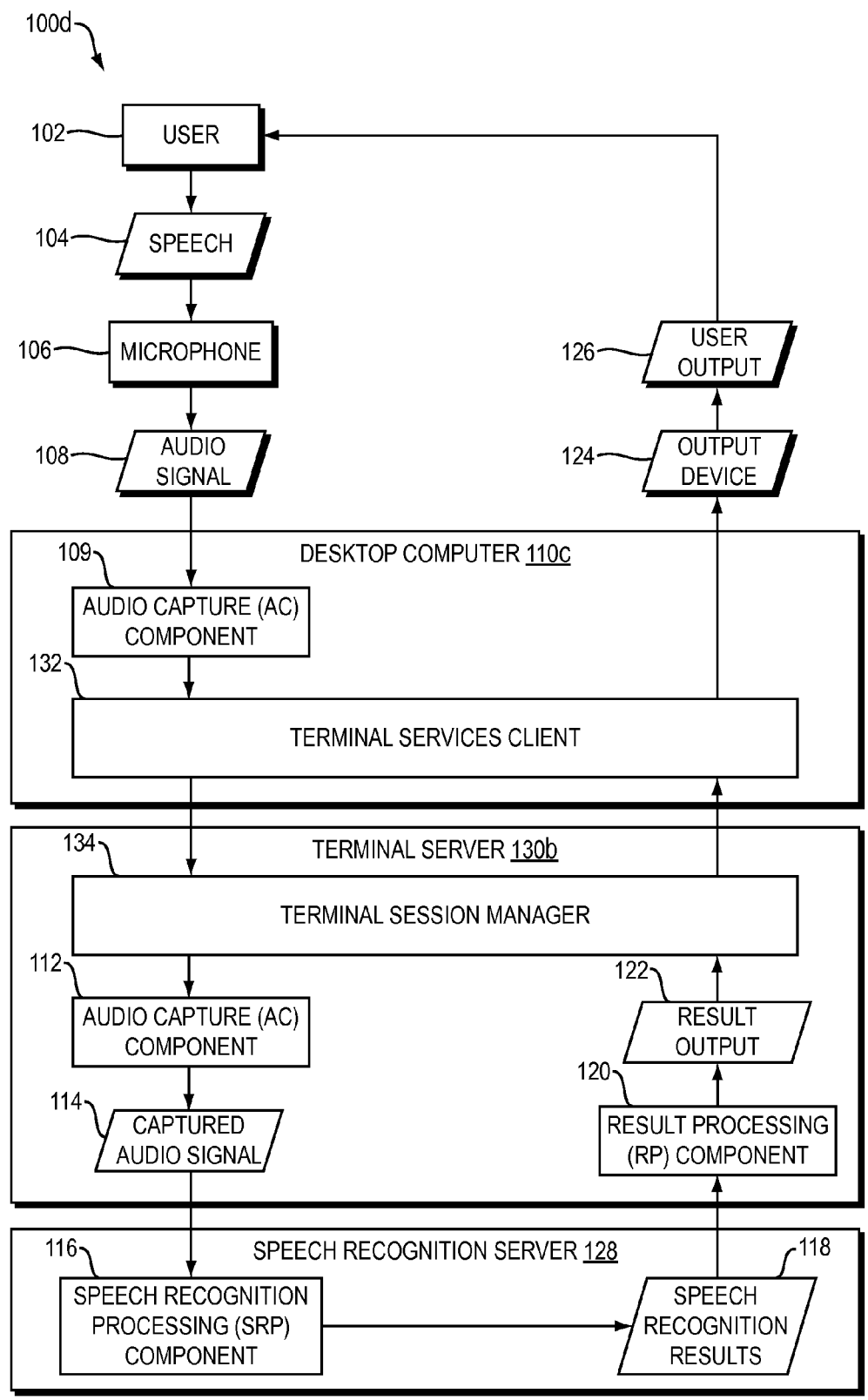

Just as the speech recognition processing component 116 of FIG. 1A may be offloaded from the desktop computer 100a of FIG. 1A to the remote speech recognition server 128 of FIG. 1B, so too may the speech recognition processing component 116 of FIG. 1C be offloaded from the terminal server 130a of FIG. 1C to produce the system 100d shown in FIG. 1D. The interaction between the terminal server 130b and the speech recognition server 128 in the system 100d of FIG. 1D, therefore, is similar to that of the interaction between the desktop computer 110b and the speech recognition server 128 of the system 100b of FIG. 1B.

As yet another example, consider the system 100d of FIG. 1D, but in which the microphone 106 is replaced by a telephone, embedded within a telephone, or used as a telephone input device. For example, the telephone may be a conventional analog telephone, in which case the desktop computer 110c may instead be a telephony server connected to the telephone over an analog telephone connection. The terminal server 130b may instead be a dialogue processing server connected to the telephony server. Otherwise, the components of the system 100d may perform the same general functions as those described above with respect to FIG. 1D. Specifically, the dialogue processing server may include the audio capture component 112 and the result processing component 120, while the speech recognition server 128 may include the speech recognition processing component 116.

Alternatively, for example, the microphone 106 and/or telephone may be or otherwise act as a Voice over Internet Protocol (VoIP) telephone, in which case the telephony server is optional. The telephone may, for example, connect to the dialogue processing server without the use of a telephony server.

In all of the cases disclosed above, the result processing component 120 is logically located on the same device as the audio capture component 112. Even in the cases (FIGS. 1C and 1D) in which the computer 110c includes terminal services client 132 and the audio capture device 106 is connected to the result processing component 120 over a network, the audio capture component 112 still resides on the same device (namely, the computer 110c) as the result processing component 120. In all of these cases, therefore, the audio capture component 112 is physically and/or logically located on the same device as the result processing component 120.

In contrast, embodiments of the present invention separate the audio capture component from the result processing component, so that the two components reside on different physical and/or logical devices than each other.

However, in embodiments of the present invention, the audio capture component is still in communication with the result processing component through a loose, dynamic coupling. Such a coupling may take any of a variety of forms and be established in any of a variety of ways. For example, the coupling between the audio capture component and the result processing component may be established at runtime by discovering and matching the application context of both components. Once such context discovery and matching is performed, the shared context of the audio capture component and result processing component may be used to enable the two components to communicate with each other by sending control and/or data signals to each other.

Figure 2A:
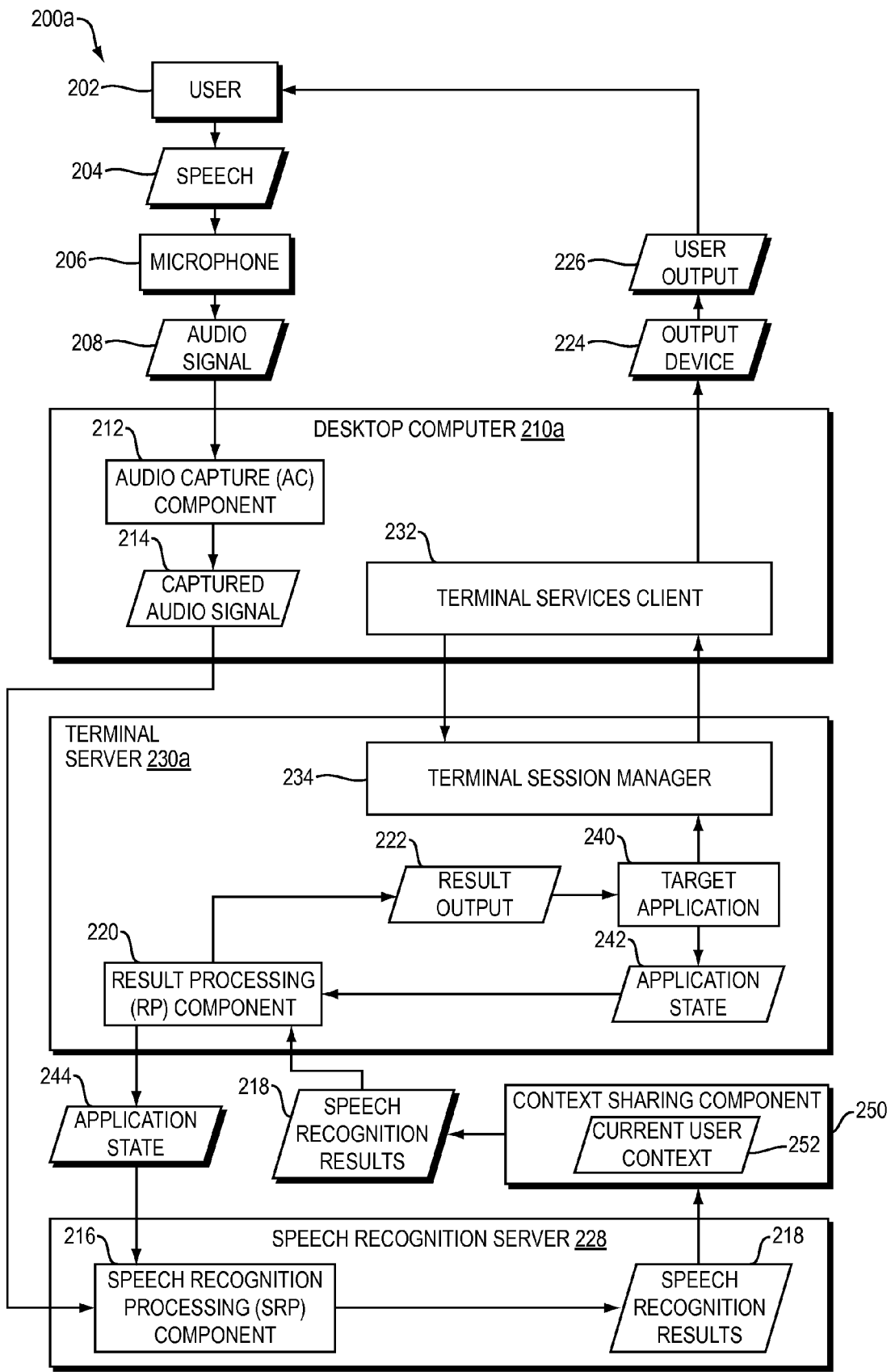
FIGS. 2A-2B are diagrams of systems for performing automatic speech recognition using distributed components according to various embodiments of the present invention.
Figure 3:
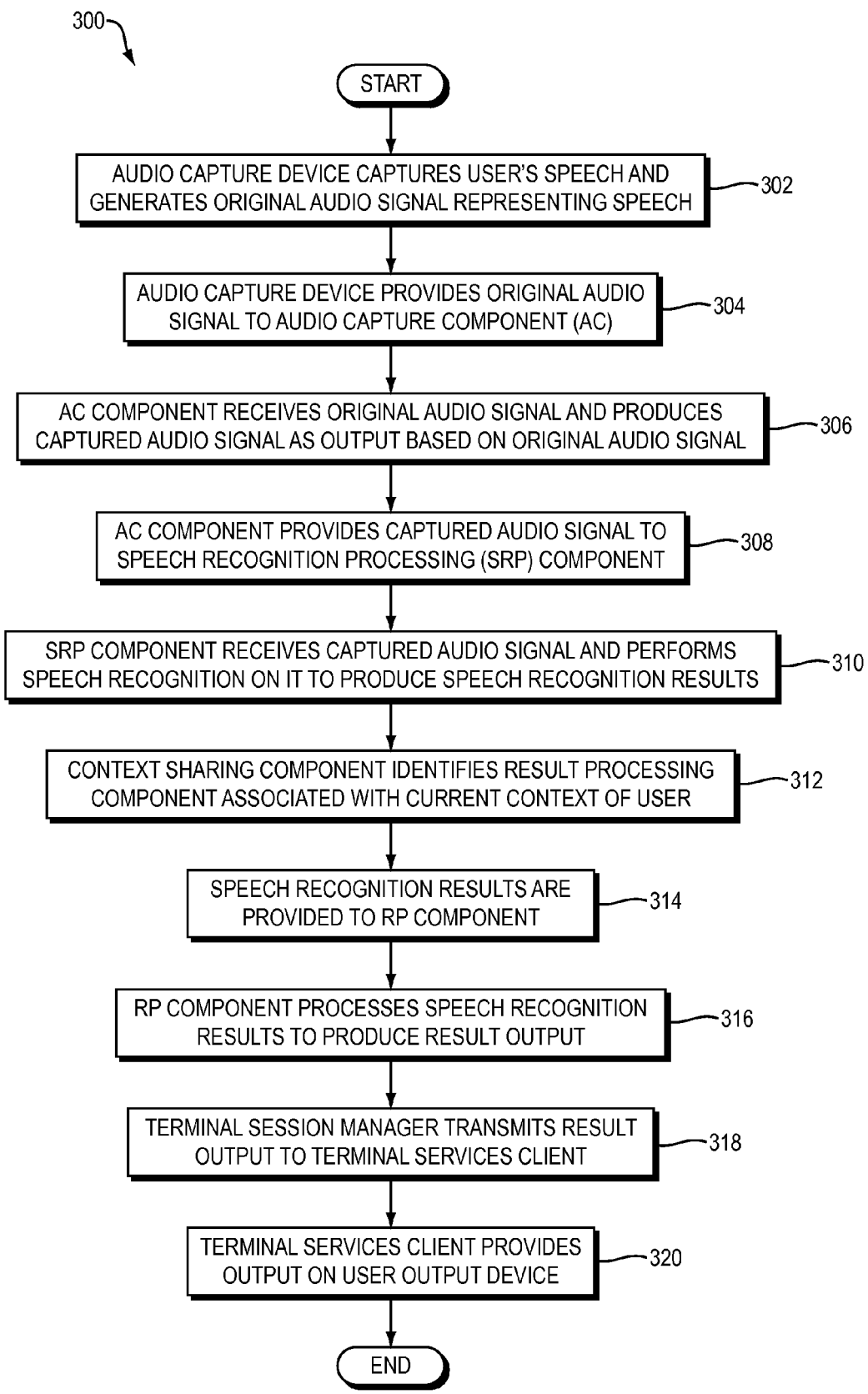
FIG. 3 is a flowchart of a method performed by the systems of FIGS. 2A-2B.

For example, referring to FIG. 2A, a dataflow diagram is shown of a system 200a implemented according to one embodiment of the present invention. Referring to FIG. 3, a flowchart is shown of a method 300 performed by the system 200a of FIG. 2A according to one embodiment of the present invention.

The system 200a of FIG. 2A includes various components which may be implemented in the same or similar manner to components of the systems of FIGS. 1A-1D. Therefore, in the discussion that follows, it should be assumed that individual components of the system 200a of FIG. 2A (and of other embodiments of the present invention) may be implemented in the same or similar manner as corresponding components in the systems 200a-d of FIGS. 1A-1D, respectively, unless stated otherwise.

For example, in the system 200a of FIG. 2A, user 202 speaks into microphone 206 (or other audio capture device) connected to desktop computer 210a. The microphone 206 captures the user's speech 204 and generates as output an original audio signal 208, which represents the speech 204 (FIG. 3, operation 302). The microphone 206 transmits or otherwise provides the original audio signal 208 to audio capture component 212, which in FIG. 2A is located on desktop computer 210a (FIG. 3, operation 304). As illustrated by the example in FIG. 2A, the audio capture component 212 is the first component in the system 200a to receive the audio signal 208 after the audio signal is output by the microphone 206.

The audio capture component 212 receives the original audio signal 208 and produces as output the captured audio signal 214 based on the original audio signal 208 (FIG. 3, operation 306). The audio capture component 212 may, for example, produce the captured audio signal 214 in any of the ways described above with respect to FIGS. 1A-1D.

Unlike the systems of FIGS. 1A-1D, however, the desktop computer 210a of the system 200a of FIG. 2A does not include result processing component 220. Instead, the result processing component 220 is located on a terminal server 230a in the system 200a of FIG. 2A. Speech recognition results 218 are generated and provided to the result processing component 220 in the system 200a of FIG. 2A as follows.

Audio capture component 212 provides the captured audio signal 214, e.g., by transmitting it over a network connection, to the speech recognition processing component 216, which in the system 200a of FIG. 2A is located on a remote speech recognition server 228 (FIG. 3, operation 308). The speech recognition processing component 216 receives the captured audio signal 214 and performs automatic speech recognition on the captured audio signal 214 to produce speech recognition results 218 (FIG. 3, operation 310).

The speech recognition results 218, once produced, must be provided to the result processing component 220. In the system 200a of FIG. 2A, however, the result processing component 220 is not located on the same device as the speech recognition processing component 216. Furthermore, as will be described in more detail below, the location of the result processing component 220 may be dynamic, e.g., the location of the result processing component 220 may vary over time in response to changes in the current context of the user 202.

Because the location of the result processing component 220 is dynamic in the system 200a of FIG. 2A, the speech recognition processing component 216 cannot rely on conventional techniques, such as a local method call or a call to a predetermined address, to provide the speech recognition results 218 to the result processing component 220. Instead, to provide the speech recognition results 218 to the result processing component 220 in the system 200a of FIG. 2A, it is necessary to identify the current location of the result processing component currently associated with the user 202 so that the speech recognition results 218 may be provided to that result processing component. In the embodiment illustrated in FIG. 2A, a context sharing component 250 in the system 200a identifies the result processing component 220 to which the speech recognition results 218 should be provided, which may include, for example, identifying a location (e.g., IP address) of the result processing component 220 and/or a method of providing the results 218 to the result processing component 220 (e.g., local procedure call if the speech recognition processing component 216 is located on the same device as the result processing component 220, or network if the speech recognition processing component 216 is located on a different device than the result processing component 220). The context sharing component 250 may identify such information about the appropriate result processing component 220 based on a current context 252 of the user 202 (FIG. 3, operation 312). Examples of the user's current context 252, and how the current context record 252 may be generated and managed, are provided below.

Assume for purposes of example that the context sharing component 250 identifies the result processing component 220 as the result processing component currently associated with the user 202. In response to such an identification, the speech recognition results 218 are provided (e.g., transmitted over a network) to the result processing component 220 (FIG. 3, operation 314).

The speech recognition results 218 may be provided to the result processing component 220 in any of a variety of ways. For example, the speech recognition processing component 216 may request that the context sharing component 250 identify a result processing component currently associated with the user 202. To enable the context sharing component 250 to identify such a result processing component, the speech recognition processing component 216 may, for example, provide the context sharing component 250 with information about the user 202, such as information derived from a current session between the user's computer 210a and the speech recognition server 228.

In response to such a request, the context sharing component may identify a result processing component currently associated with the user 202, and provide information identifying the result processing component to the speech recognition processing component 216. The speech recognition processing component 216 (or other component of the speech recognition server 228) may use such information to transmit the speech recognition results 218 to the identified result processing component 220. As another example, the speech recognition processing component 216 may provide the speech recognition results 218 to the context sharing component 250 (e.g., as part of the request to identify a result processing component associated with the user 202), and the context sharing component 250 may in turn provide the speech recognition results 218 to the identified result processing component 220 after identifying the result processing component 250.

Once the result processing component 220 receives the speech recognition results 218, the speech recognition results 218 may be processed by the result processing component 220 and other components of the system 200a in the same or similar manner to that described above with respect to FIGS. 1A-1D to produce result output (FIG. 3, operation 316). In general, the result processing component 220 may provide the result output 222 to an application 240 executing on the terminal server 230a in a session of the terminal session manager 234. If the results 218 include text or other data output representing content of the speech 204, then the application 240 may process the results 218 by, for example, inserting the results 218 into a document as part of a transcription process. As another example, if the results 218 include one or more commands, then the application 240 may process the results 218 by executing the commands to perform functions such as closing windows, opening files, or executing software.

Such actions performed by the application 240 are examples of actions that may change the current state of the application. For example, inserting a word into an open document of the target application 240 may change the state of the application in various ways, such as by changing the contents of the document and changing the position of the text cursor within that document. The result processing component 220 may obtain application state data 242 from the target application 240. The application state data 242 may, for example, include data reflecting a change in the state of the target application 240 resulting from processing of the result output 222 by the target application 240. The target application 240 may, for example, push the application state data 242 to the result processing component 220 upon a change of state in the application 240 or, as another example, the result processing component 220 may obtain the application state data 242 from the application 240 in response to a request from the result processing component 220 for such data 242.

The result processing component 220 may inform the speech recognition processing component 216 of the state of the target application 240. For example, after receiving the application state data 242 from the target application 240, the result processing component 220 may transmit an application state message 244 to the speech recognition processing component 216. The application state message 244 may, for example, represent the same data as the application state data 242, but may take a different form. The result processing component 220 may, for example, push the application state message 244 to the speech recognition processing component 216 in response to receiving the application state data 242 from the application 240 or, as another example, the speech recognition processing component 216 may receive the application state message 244 from the target application 240 in response to a request from the speech recognition processing component 216 for such a message 244. The application state message 244 may, for example, be transmitted over a network using any network protocol.

The speech recognition processing component 216 may take any appropriate action in response to and based on the content of the application state message 244. For example, the speech recognition processing component 216 may change any aspect of its speech recognition context (e.g., the current acoustic model and/or language model) in response to and based on the content of the application state message 244. For example, if the application state message 244 indicates that the application 240 currently is displaying a particular dialog box, then in response to the message 244 the speech recognition processing component 216 may change its language model to reflect the user interface elements (e.g., buttons) contained within the dialog box.

The target application 240 may be any software executing on the terminal server 230a in a session of the terminal session manager 234. The target application 240 need not be an application program and may, for example, be an operating system or other non-application software. Therefore, another example of an application state change that may be reflected in the application state message 244 is a switch in foreground from one application to another within the same operating system, in response to which the speech recognition processing component 216 may change any aspect of its speech recognition context (e.g., the current acoustic model and/or language model) to reflect the application currently in the foreground.

Although the application state message 244 is shown in FIG. 2A as being transmitted directly by the result processing component 220 to the speech recognition processing component 216, alternatively the result processing component 220 may transmit the application state message 244 to the context sharing component 250, which may then transmit the application state message 244 (or any data contained within the application state message 244) to the speech recognition processing component 216 using any of the techniques disclosed herein. For example, after text has been inserted into a document by the application 240 (whether as a result of transcribing speech or by other means, such as typing the text directly into the document), the result processing component 220 may inform the context sharing component 250 of the new state of the application 240 by transmitting the application state message 244 to the context sharing component 250. The context sharing component 250 may store a record of this state change, and either proactively forward such a record to the speech processing component 216, or make the record available for retrieval by the speech recognition processing component 216. This is merely one example of a way in which the context sharing component 250 may act as a registry for storing information provided by speech recognition components, and for making such stored information available to the speech recognition components. One benefit of this feature of the context sharing component 250 is that it enables the various speech recognition components to communicate with each other despite the lack of traditional communication mechanisms (e.g., local procedure calls) which would be available to the speech recognition components if they were all resident and executing on the same logical and/or physical machine.

In the system 200a of FIG. 2A, the computer 210a contains a terminal services client 232 (such as Citrix client software) for establishing and maintaining a terminal session connection with the terminal session manager 234 on the terminal server 230a. The terminal session manager 234 may receive and transmit the result output 222 to the terminal services client 232 (FIG. 3, operation 318), which in turn may forward the result output 222 to an appropriate output device 224 connected to the desktop computer 210a to provide output 226 to the user 202 (e.g., a computer monitor) (FIG. 3, operation 320). If the results 218 include text, for example, which is inserted into a document, the user output device 224 may display the updated document as the user output 226. As another example, if the results 218 include a command for launching an application program, then the user output device 224 may display the application program window(s) as the user output 226.

The system 200a of FIG. 2A has a variety of advantages over the prior art systems illustrated in FIGS. 1A-1D. For example, the audio capture component 212 on the desktop computer 210a in FIG. 2A may be a software application installed on the desktop computer 210a for capturing the audio signal 208 from the microphone 206. Compare this to the system 100d of FIG. 1D, in which the audio capture component 112 is on the terminal server 130b. In FIG. 1D, because the original audio signal 108 must first be transmitted over a network connection from the desktop computer 110c to the terminal server 130b before being captured by the audio capture component 112, the resulting captured audio signal 114 may be suboptimal because, for example, the original audio signal 108 may experience loss or other degradation in transmission from the desktop computer 110c to the terminal server 130b. Such degradation is common in conventional systems because the audio signal 114 is compressed in a way that is optimized for playback to a human. The resulting compressed audio signal is of lower quality than is needed for optimal speech recognition. In contrast, in the embodiment illustrated in FIG. 2A, the captured audio signal 214 produced by the audio capture component 212 may be optimized for the purpose of speech recognition, thereby improving the quality of the speech recognition results 218.

Despite the separation of the audio capture component 212 and the result processing component 220 in the embodiment of FIG. 2A, the result processing component 220 may still process the speech recognition results 218 to produce the result output 222 in real-time or substantially in real-time. Similarly, the system 200a may process the speech 204 to produce the result output 222 and provide the result output 222 to the target application 240 in real-time or substantially in real-time. As a result, the combined process of recognizing the speech 204, processing the speech recognition results 218 to produce the result output 222, and providing the result output 222 to the target application 240 may be performed in real-time or substantially in real-time. Similarly, the result processing component 220 may receive the application state data 242 and provide the application state message 244 to the speech recognition processing component 216 in real-time or substantially in real-time. Although some delay may be introduced between utterance of the speech 204 and generation of result output 222, such delay may be due solely to delays inherent in the operation of components such as the audio capture component 212, speech recognition processing component 216, and result processing component 220, and transmission delays between them, not due to any storage of the audio signal 208, captured audio signal 214, or speech recognition results 218 while waiting for action to be taken by a human operator, such as a transcriptionist. Instead, each of the components 212, 216, and 220 may generate its output as quickly as possible upon receipt of its input, and may provide its output to the consumer of such output immediately upon generating such output.

The audio capture component 212 and result processing component 220 may be separated from each other onto different physical and/or logical devices in ways other than that illustrated in FIG. 2A. For example, in the system 200b of FIG. 2B, the user 202 speaks into a telephone 207 (which may contain a microphone or other audio capture device) to produce audio signal 208. The audio signal 208 is provided to speech recognition server 228, which may also function as a telephony server in the system 200b of FIG. 2B. The server 228 includes an audio capture component 213, which may receive the audio signal 208 from a VoIP component of the server 228 and produce captured audio signal 214. Note that in FIG. 2B the telephone 207 is not directly coupled to the desktop computer 210b, whether by a wired connection or a wireless (e.g., Bluetooth) connection. As a result, the audio capture component 212 is the first component in the system 200b to receive the audio signal 208 after the audio signal is output by the device (namely, the telephone 207) which outputs the audio signal 208 based on the speech 204 of the user. The system 200b of FIG. 2B may operate in other respects in the same manner as the system 200a of FIG. 2A.

Figure 2B:
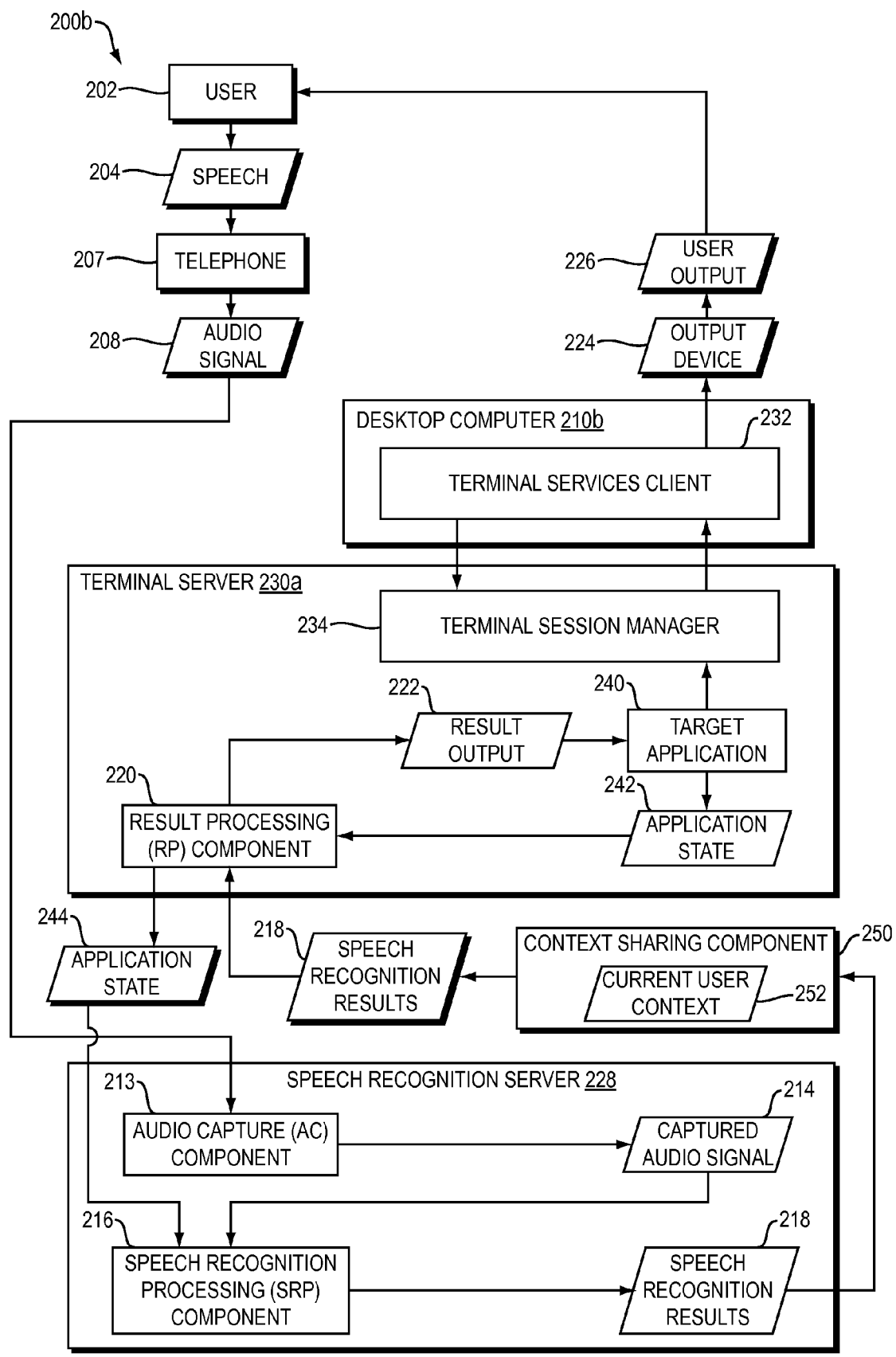

The system 200b of FIG. 2B is another example of an embodiment of the present invention in which the audio capture component 212 is located on a different physical and/or logical device from the result processing component 220. Furthermore, in the system 200b of FIG. 2B, the computer 210b, containing the terminal services client 232, is a distinct physical and/or logical device from that which contains the audio capture component 212. One benefit of the system 200b of FIG. 2B is that it enables speech recognition to be performed using a computing device, such as the desktop computer 210b, even when there is no microphone connected locally to that computing device.

Even when the computer 210b is not well-suited for the audio capture component 212 (e.g., because it is not locally connected to a microphone), the computer 210b may be well-suited to execute the terminal services client 232. For example, the computer 210b may contain sufficient computational resources to execute the terminal services client 232 effectively, and may also contain a full-sized keyboard and mouse for receiving input from the user 202, a full-sized monitor for displaying output 226 to the user 202, and a high-speed wired network connection for communicating with the terminal server 230a. As a result, the configuration illustrated in FIG. 2B, in which the audio capture component 212 is located on the speech recognition server 228 and the terminal services client 232 is located on the computer 210b, may distribute the audio capture component 212 and the terminal services client 232 so that each such component is located and executed by the device best suited for it.

In the system 200b of FIG. 2B, the user 202 can take full advantage of the significant processing power of the speech recognition server 228, while taking full advantage of the input and output capabilities of the computer 210b. For example, the user 202 may speak into the microphone 206 (e.g., a microphone contained within or connected to (by wire or wirelessly) a VoIP telephone or cellular telephone) and experience the results of applying speech recognition to the speech 204 rapidly, e.g., in real-time. For example, the user 202 may dictate into the microphone 206 and, in response, the terminal services client 232 may display transcribed text (as output 226) corresponding to the user's speech 204 in real-time. As another example, the user 202 may speak commands into the microphone 206 and, in response, the terminal services client 232 may display the results (as output 226) of executing those commands. From the user's perspective, such an experience may be similar to or indistinguishable from the experience of using an automatic speech recognition system located on the desktop computer 210b itself, even though in fact the components 112, 116, and 120 of the speech recognition system are located remotely on the speech recognition server 228, and even though the microphone 206 is not connected to the desktop computer 210b.

As mentioned above, the context sharing component 250 may store, maintain, or otherwise access and make use of the current context 252 of the user 202 when connecting the audio capture component 212, speech recognition processing component 216, and result processing component 220 with each other. For example, the current context 252 of the user 202 may indicate which audio capture component(s), speech recognition processing component(s), and result processing component(s) are currently being used, or otherwise available for use, by the user 202. Such components may include, for example, any such components which are located on devices currently being used by the user 202.

The context sharing component 250 may generate, store, maintain, and/or access a record 252 of the user's current context. Such a record 252 may represent the user's context at a particular point in time. Therefore, as described in more detail below, the context record 252 associated with the user 202 may change over time as the user 202 starts using new devices (or otherwise obtains access to new speech recognition components) and as the user 202 stops using previously-used devices (or otherwise terminates access to speech recognition components).

Figure 6A:
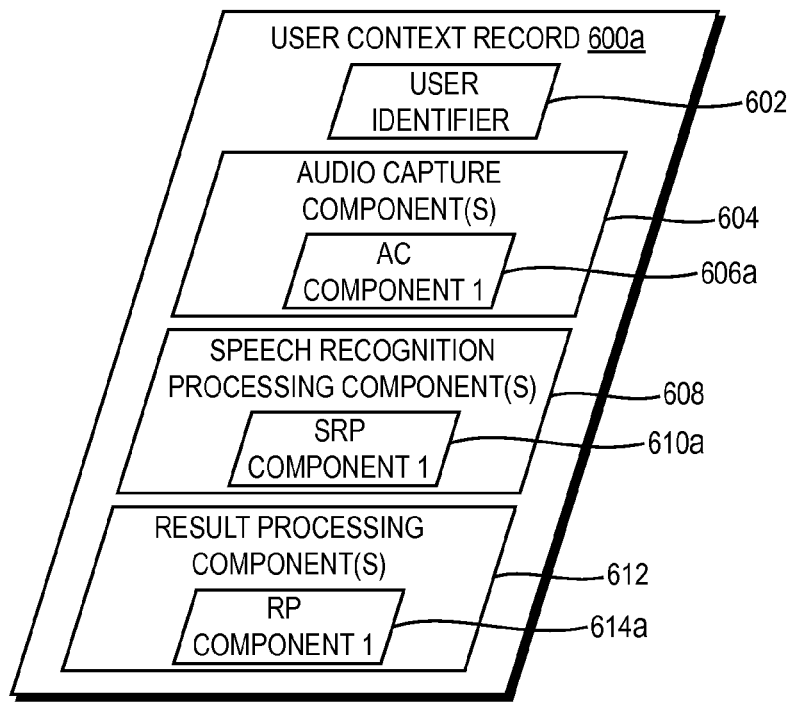
FIGS. 6A-6B are diagrams of data structures representing the current context of a user at different times according to one embodiment of the present invention.

For example, referring to FIG. 6A, an example is shown of a user context record 600a according to one embodiment of the present invention. The context record 600a in FIG. 6A is an example of the current user context record 252 shown in FIGS. 2A and 2B. The context record 600a includes an identifier 602 of the user 202. The identifier 602 may include any data which distinguishes the user 202 from other users, and/or which enables the user 202 to be located and/or communicated with. For example, the user identifier 602 may include any one or more of a user name, password, email address, Internet Protocol (IP) address, and session identifier (such as a session identifier of a session of the user 202 with the terminal server 230a-b, the speech recognition server 228, or the context sharing component 250).

The context record 600a also includes lists of audio capture components 604, speech recognition processing components 608, and result processing components 612 located and executing on devices currently being used by the user 202, or which otherwise are currently authorized for use by or on behalf of the user 202. In the particular example illustrated in FIG. 6A, the audio capture component list 604 lists exactly one audio capture component (in element 606a), the speech recognition processing component list 608 lists exactly one speech recognition processing component (in element 610a), and the result processing component list 612 lists exactly one result processing component (in element 614a). However, any of the lists 604, 608, and 612 may contain any zero, one, or more speech recognition components at any time. For example, the lists 604, 608, and 612 may specify solely a result processing component, or specify both a result processing component and a speech recognition processing component, or both a result processing component and an audio capture component, or both an audio capture component and a speech recognition processing component, or a result processing component, audio capture component, and speech recognition processing component.

As the preceding description indicates, any one or more of the lists 604, 608, and 612 may specify zero components. Alternatively, for example, the user context record 600a may contain fewer than all of the lists 604, 608, and 612. For example, the user context record 600a may contain only list 604, only list 608, or only list 612. As another example, the user context record 600a may contain only list 604 and 608 but not 612, or only list 604 and 612 but not 608, or only list 608 and 612 but not 604. In such embodiments, the user's context may be defined by reference to only a single speech recognition component, or by reference to only two speech recognition components.

As another example, the result processing component list 612 may specify multiple result processing components, indicating that the corresponding user is associated with multiple result processing components concurrently. For example, the user may use a first result processing component on one computing device (e.g., a desktop computer) while using a second result processing component on another computing device (e.g., an Apple iPad tablet computer). Concurrently the speech recognition processing component list 608 of the user context record 600a may, for example, specify a single speech recognition processing component. In this example, the single speech recognition processing component is used to produce and provide speech recognition results to both of the result processing components associated with the user. The results of the speech recognition processing component may be provided to the appropriate result processing component, e.g., by the context sharing component 250, in any of a variety of ways. For example, the speech recognition processing component may identify the target application based on the application context and set a flag that identifies the target application. The context sharing component 250 may then provide the speech recognition processing component's output to the result processing component associated with (e.g., executing on the same machine as) the target application identified by the flag.

Assume for purposes of example that the user 202 currently is using the system 200a of FIG. 2A. As a result, the user context record 600a may include:
- a record (in element 606a) indicating that the audio capture component 212 is to be used to perform audio capture on the audio 208 generated from the user's speech 204;
- a record (in element 610a) indicating that the speech recognition processing component 216 is to be used to perform automatic speech recognition on the captured audio signal 214 produced by the audio capture component 212; and
- a record (in element 614a) indicating that the result processing component 220 is to be used to process the results 218 generated by the speech recognition processing component 216.

Such records 606a, 610a, and 614a may include any information which is necessary or useful for enabling the appropriate input to be provided to the audio capture component 212, speech recognition processing component 216, and result processing component 220, respectively. Such information may include, for example, a location (e.g., IP address) of the component and/or a method of providing the appropriate input to the component (e.g., local procedure call or network transmission).

Figure 4:
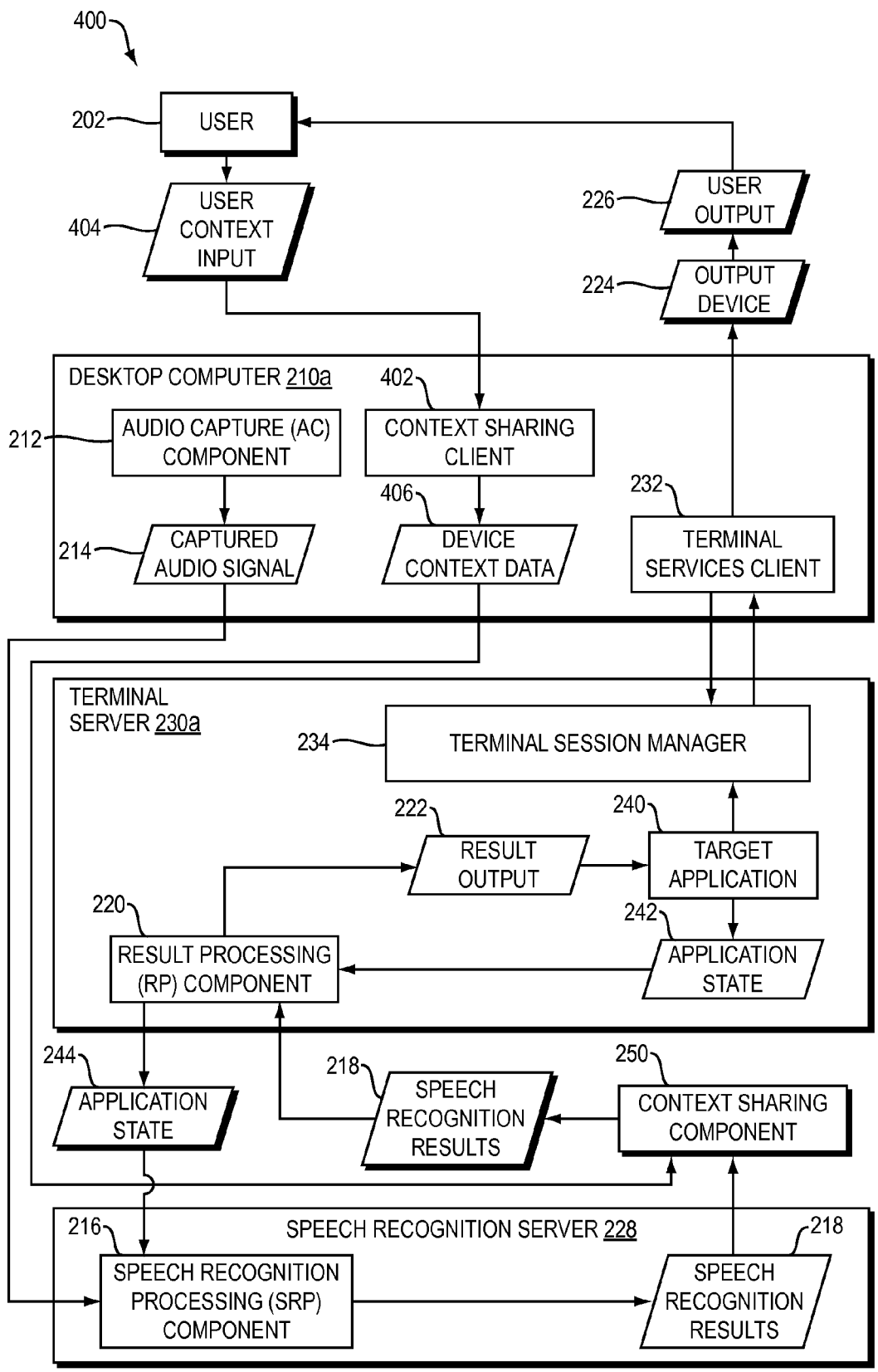
FIG. 4 is a diagram of a system for identifying the current context of a user according to one embodiment of the present invention.
Figure 5:
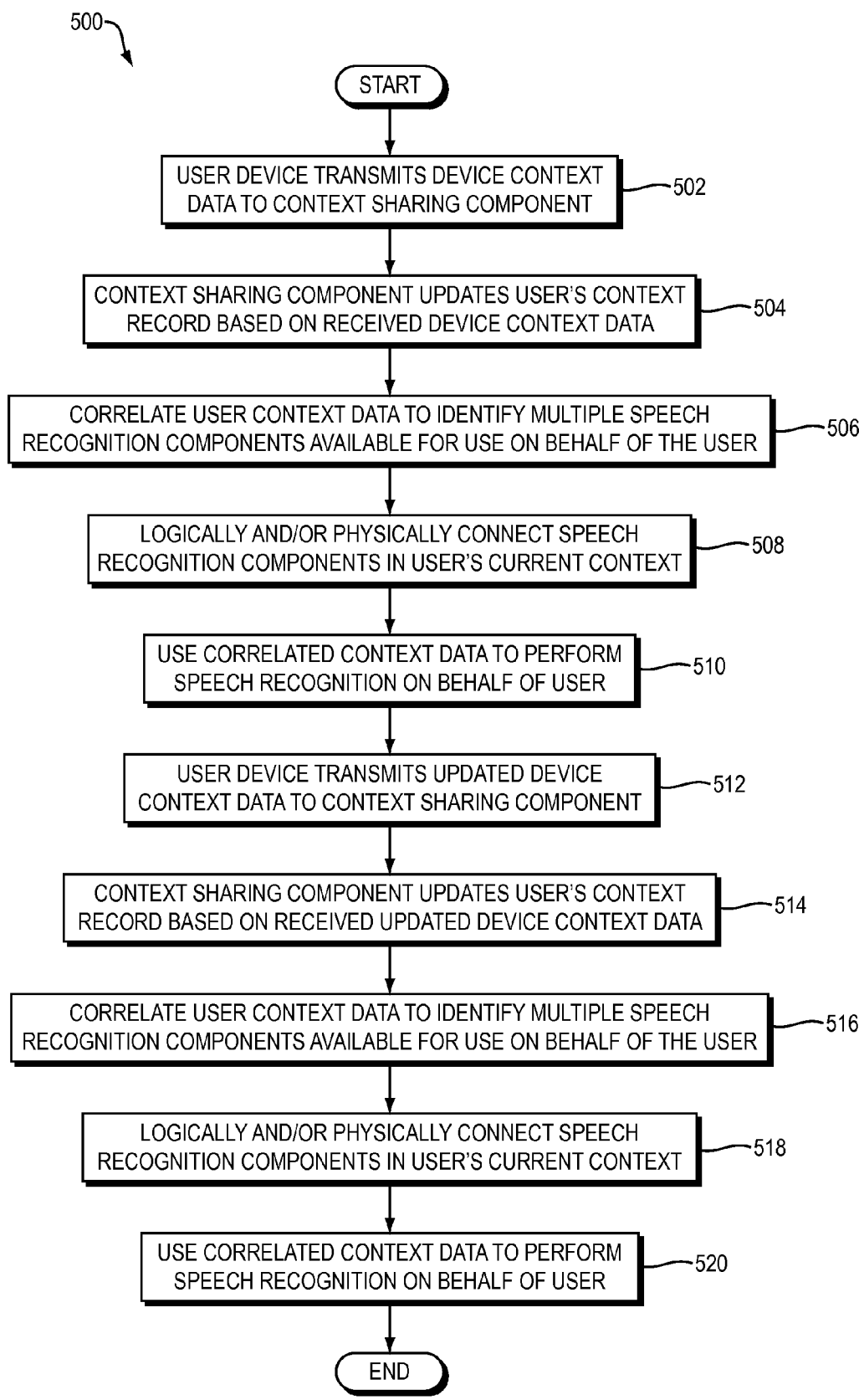
FIG. 5 is a flowchart of a method performed by the system of FIG. 4 according to one embodiment of the present invention.

The context sharing component 250 may gather information about the devices and components currently accessible to the user 202 in any of a variety of ways. For example, FIG. 4 shows a dataflow diagram of a system 400 for identifying the user's current context according to one embodiment of the present invention. FIG. 5 shows a flowchart of a method 500 performed by the system 400 of FIG. 4 according to one embodiment of the present invention. User context may, however, be identified, recorded, maintained, and processed in other ways.

Furthermore, although the system 400 of FIG. 4 includes a configuration that is similar to that shown in FIG. 2A, this is merely an example and not a limitation of the present invention. Although the system 400 of FIG. 4 may include additional components from the system 200a of FIG. 2A, such as the microphone 206, which may operate in the same or similar manner to that described in connection with FIG. 2, such components are not shown in FIG. 4 for ease of illustration.

When the user 202 first begins to use a particular device, such as the desktop computer 210a in FIG. 4, or when the user 202 otherwise wishes to make speech recognition components on that device available for use in performing speech recognition on behalf of the user 202, the user 202 may provide input 404 which causes the device (e.g., the desktop computer 210a) to transmit information 406 about itself and the speech recognition components on the device to the context sharing component 250 (FIG. 5, operation 502). The user 202 may, for example, log into a user account maintained by the context sharing component 250, such as by providing credentials (e.g., a unique username and password) to the context sharing component. In response to the user logging in to his or her account, the context sharing component may retrieve the device context data 406 from the device, such as by using a context sharing client 402 on the desktop computer 210a to transmit data descriptive of the desktop computer 210a and of the speech recognition components located on the desktop computer 210a (e.g., the audio capture component 212 in the system 400 of FIG. 5).

The context sharing component 250 may update the context record associated with the user 202 to reflect the retrieved data, e.g., to reflect that the user 202 currently is using desktop computer 210a, which contains and is executing audio capture component 212 (FIG. 5, operation 504). For example, assume that such an update results in updating the user context record 600a in FIG. 6 to indicate that the user 202 currently is using audio capture component 212 on desktop computer 210a. If the desktop computer 210a were to include additional speech recognition components (such as a speech recognition processing component and/or result processing component), information about such components would also be provided to the context sharing component 250 and used by the context sharing component 250 to update the user's context record.

Operations 502 and 504 in FIG. 5 may be repeated for any number of devices currently being used by the user 202. For example, if the user 202 is using an audio capture component on a mobile phone, while using a result processing component on a terminal server, the user 202 may log in to the context sharing component 250 through both such devices, thereby enabling the context sharing component 250 to determine that the user 202 currently is using the audio capture component on the mobile phone and the result processing component on the terminal server.

The context sharing component 250 may associate with the user 202, and optionally store in the user's context record 252, information about speech recognition components which are not dependent on the user's current context 252. For example, the user's current context record 252 may indicate that the user's default result processing component is the result processing component 220 located on the terminal server 230a. As a result, the context sharing component 250 may associate the result processing component 220 with the user 202, independently of the user's current context 252. One way in which this may be done is to automatically include a record of the result processing component 220 in the user's result processing component list 612 (FIG. 6A), whether or not the user 202 or any of the user's devices provides an indication to the context sharing component 250 that the user 202 currently is connected to or otherwise using the terminal server 230a.

The context sharing component 250 and/or context sharing client 402 may use various techniques to automatically identify speech recognition components currently available for use on behalf of the user 202. For example, the context sharing client 402 may detect that the user's computer 210a currently is connected to the terminal server 230a over a terminal services session, and thereby determine that the result processing component 220 on the terminal server 230a is available for processing speech recognition results on behalf of the user 202. The context sharing client 402 may inform the context sharing component 250 of such a determination, in response to which the context sharing component 250 may record, in the user's context record 252, that the result processing component 220 is available for use on behalf of the user 202.

The context sharing component 250 may correlate the context information stored in the user's context record 252 (e.g., the context record 600a of FIG. 6A) to draw a conclusion that all components listed in the user's context record 252 currently are available for use on behalf of the user 202 (operation 506). Once the context sharing component 250 has identified the current context of the user 202, including at least one audio capture component, speech recognition processing component, and result processing component associated with the user 202, the context sharing component 250 may be used to logically and/or physically connect such components to perform speech recognition (FIG. 5, operation 508). The techniques described above with respect to FIGS. 2A-2B and FIG. 3 are examples of ways in which this dynamic creation of couplings among speech recognition components may be used to perform speech recognition using components which are distributed across multiple logical and/or physical devices (FIG. 5, operation 510).

A particular user context record, such as the context record 600a of FIG. 6A, may remain valid and continue to be used, e.g., by the systems 200a-c of FIGS. 2A-2B, unless and until such a record changes or becomes invalid for some reason. For example, the record 600a may continue to be used, and treated as an accurate reflection of the user's current context, unless and until the user logs out from the context sharing component 250. In particular, if the user 202 logs out from the context sharing component 250 using a particular device, then the context sharing component may remove from the user's context record 600a all speech recognition components located on the particular device. Similarly, the context sharing component 250 may perform such removal in response to loss of a network connection with the particular device, or expiration of a particular amount of time (e.g., 30 minutes) without having contact with the particular device. As yet another example, the context record 600a may be treated as an accurate reflection of the user's current context unless and until the user 202 (or an administrator or other user) expressly modifies the record 600a.

As these examples illustrate, the user context record 600a may reflect the context of the user 202 at a particular point in time, or during a particular range of times. As this implies, as the user's context changes over time, the user's context record 600a may change over time in response to reflect the user's changing context. One particularly useful example of such modifications to the context record 600a is to reflect changes in device usage by the user 202. For example, assume that the context record 600a indicates (in element 606a) that the user 202 is using the audio capture component 212 on the desktop computer in FIG. 2A at a first time. Then assume that at a second, later, time the user 202 begins using a mobile phone connected to an audio capture component in a speech recognition server, as in the system 200b of FIG. 2B. The user 202 may log in to the context sharing component 250 using the mobile phone, or otherwise cause the context sharing component 250 to be informed that the audio capture component on the speech recognition server 228 is now available for use on behalf of the user 202 (FIG. 5, operation 512).

The context sharing component 250 may update the context record associated with the user 202 to reflect the retrieved data, e.g., to reflect that the user 202 currently is using the mobile phone connected to the audio capture component 212 on the speech recognition server 228 (FIG. 5, operation 514). This may, for example, result in removing the record of the desktop computer audio capture component from the user's context record and replacing it with a record of the audio capture component 212 on the speech recognition server 228, as shown in the context record 600b of FIG. 6B, in which element 606b represents the audio capture component 212 on the speech recognition server 228.

For example, assume that such an update results in updating the user context record 600a in FIG. 6 to indicate that the user 202 currently is using audio capture component 212 on desktop computer 210a. If the desktop computer 210a were to include additional speech recognition components (such as a speech recognition processing component and/or result processing component), information about such components would also be provided to the context sharing component 250 and used by the context sharing component 250 to update the user's context record.

Figure 6B:
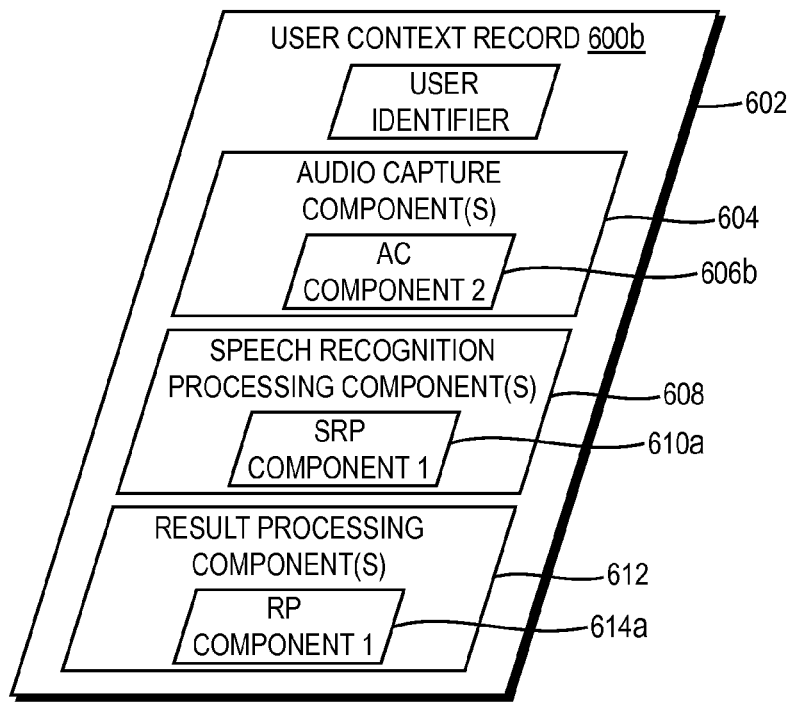

Therefore, although in the example of FIGS. 6A and 6B it is the audio capture component associated with the user's current context which changes, this is merely an example. Additionally or alternatively, the speech recognition processing component and/or result processing component that is associated with the user's current context may change over time. For example, a first speech recognition processing component may be associated with the user's current context at a first time, and a second speech recognition processing component (which differs from the first speech recognition processing component) may be associated with the user's current context at a second time. Similarly, a first result processing component may be associated with the user's current context at a first time, and a second result processing component (which differs from the first result processing component) may be associated with the user's current context at a second time.

Once the user's context record has been updated to reflect the user's new current context, the context sharing component 250 may correlate the updated user context information (FIG. 5, operation 516), and logically and physically connect such components to perform speech recognition (FIG. 5, operation 518). The new set of speech recognition components associated with the user 202 may then be used to perform speech recognition on the user's behalf (FIG. 5, operation 520).

As the examples described above indicate, the context sharing component 250 may identify the speech recognition components currently associated with the user 202 dynamically and at run-time. As the user's context changes, the context sharing component 250 may detect such changes and update the user's context record to reflect such changes. As a result, for example, the result processing component to which the context sharing component 250 routes the speech recognition results 218 may change automatically, dynamically, and at run-time, without the need to modify any components of the system, such as the audio capture component 212, speech recognition processing component 216, or result processing component 220, and without the need to modify any devices in the system, such as the desktop computer 210a, terminal server 230a, or speech recognition server 228.

The context sharing component 250, therefore, is an example of a means for dynamically coupling at least two speech recognition components to each other. "Dynamically coupling" a first component to a second component refers to a process in which: (1) at a first time, the first component and the second component are not both associated with a user; (2) a state change occurs, as a result of which, at a second time, both the first component and the second component are associated with the user, such that results produced by one of the two components on behalf of the user are transmitted to the other of the two components.

Two coupled components (i.e., two components that are associated with the same user) may communicate with each other directly or indirectly. An example of direct communication between two coupled components is one in which the context sharing component 250 is used to obtain information about the coupling being the two components, after which the two components communicate directly with each other. For example, a result processing component may request, from the context sharing component 250, information about which speech recognition processing component is currently associated with a user, in response to which the context sharing component 250 may provide such information to the requesting result processing component. The result processing component may then use such information to communicate directly with the speech recognition processing component identified by the context sharing component 250, without further involvement by the context sharing component. Direct communication may, for example, be pull-based communication (i.e., in which one component requests data from the other component, which responds to the request with the requested data) or push-based communication (i.e., in which one component provides data to the other component but not in response to a request for such data from the other component).

Alternatively, two coupled components may communicate with each other indirectly through the context sharing component 250. For example, the context sharing component 250 may be used both to determine which components are currently coupled to each other and then to relay results from one coupled component to another in either or both directions. For example, one of the coupled components may provide output to the context sharing component 250, which may then result that output to one or more of the other coupled components.

The ability of embodiments of the present invention to dynamically couple speech recognition components to each other also implies that at a first time a first component may be coupled to a second component but not to a third component, and that at a second time the first component may be coupled to the third component. At the second time the first component may or may not be coupled to the second component. In other words, if the first component is coupled to the second component, then coupling the first component to the third component may or may not involve de-coupling the first component from the second component.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

FIGS. 2A-2B illustrate various examples of ways in which speech recognition components (e.g., audio capture, speech recognition processing, and result processing components) may be distributed across multiple logical and/or physical devices, these are merely examples and do not constitute limitations of the present invention. Speech recognition components may be distributed across the kinds of devices illustrated, and across other kinds of devices, in various other ways.

The context sharing component 250 may be implemented in any of a variety of ways. For example, it may be located on any one or more of the devices illustrated herein, such as the desktop computers 210*a-b*, speech recognition server 228, and/or terminal server 230*a-b*. Alternatively, for example, the context sharing component 250 may be implemented on a logical and/or physical device distinct from those on which any of the speech recognition components reside. As another example, the context sharing component 250 may be integrated, in whole or in part, with one or more of the speech recognition components.

Furthermore, the context sharing component 250 is not required in all embodiments of the present invention. Rather, certain embodiments of the present invention may omit the context sharing component. For example, the Citrix Virtual Channels technology enables plugins to be installed to the client software (e.g., the terminal services client 232). Embodiments of the present invention may be implemented using such a plugin. For example, in one embodiment of the present invention, such a plugin is installed into the terminal services client 232 of FIG. 2B. In this embodiments, the context sharing component 250 may be omitted. In such an embodiment, the context matching described herein may be implemented, for example, by using the audio capture component 213 and/or the speech recognition processing component 216 to look for and find a Virtual Channel of the present invention executing within the terminal services client 232 on the desktop computer 210*b*. Upon locating such a virtual channel, the audio capture component 213 and/or speech recognition processing component 216 may communicate directly with the plugin, thereby eliminating the need for the context sharing component 250.

The structure and content of the user context records 600*a-b* shown in FIGS. 6A-6B are merely examples and do not constitute limitations of the present invention. Rather, the functions performed by the user context record may be implemented in other ways. For example, the user context record may include a list of pairings, where each pairing pairs a device associated with the user with a corresponding speech recognition component available on that device.

The techniques described above may be implemented, for example, in hardware, software tangibly stored on a computer-readable medium, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/ or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A system comprising:
    a first device including an audio capture component, the audio capture component comprising means for capturing an audio signal representing speech of a user to produce a captured audio signal;
    a speech recognition processing component comprising means for performing automatic speech recognition on the captured audio signal to produce speech recognition results;
    a second device including a result processing component;
    a context sharing component comprising:
        means for determining that the result processing component is associated with a current context of the user, comprising:
            means for identifying a list of at least one result processing component currently authorized for use on behalf of the user; and
            means for determining that the at least one result processing component in the list is associated with the current context of the user; and
    wherein the result processing component comprises means for processing the speech recognition results to produce result output.

2. The system of claim 1:
    wherein the system further comprises means for providing the speech recognition results to the result processing component in response to the determination that the result processing component is associated with the current context of the user.

3. The system of claim 2, wherein the context sharing component comprises the means for providing the speech recognition results to the result processing component.

4. The system of claim 2, wherein the speech recognition processing component comprises the means for providing the speech recognition results to the result processing component.

5. The system of claim 2, wherein the means for determining comprises means for determining, at run-time, that the result processing component is associated with the user.

6. The system of claim 2, wherein the means for providing the speech recognition results to the result processing component comprises means for providing the speech recognition results to the result processing component in real-time.

7. The system of claim 1, wherein the system further comprises an audio capture device coupled to the first device, and wherein the audio capture device comprises means for capturing the speech of the user, means for producing the audio signal representing the speech of the user, and means for providing the audio signal to the audio capture component; and
    wherein the first device does not include the speech recognition processing component.

8. The system of claim 7, wherein the first device further comprises means for transmitting the captured audio signal to the speech recognition processing component over a network connection.

9. The system of claim 1, wherein the second device further includes a terminal session manager.

10. The system of claim 9, wherein the second device further includes the speech recognition processing component.

11. The system of claim 9, wherein the first device further comprises a terminal services client, wherein the terminal services client comprises means for establishing a terminal services connection with the terminal session manager.

12. The system of claim 9, further comprising a third device, wherein the third device includes the speech recognition processing component, and wherein the third device does not include a terminal session manager.

13. The system of claim 1, wherein the second device further includes the speech recognition processing component.

14. The system of claim 1, further comprising a third device, wherein the third device includes the speech recognition processing component.

15. The system of claim 1, wherein the first device comprises a logical device.

16. The system of claim 1, wherein the first device comprises a physical device.

17. The system of claim 1, wherein the second device comprises a logical device.

18. The system of claim 1, wherein the second device comprises a physical device.

19. The system of claim 1:
    wherein the first device further comprises the speech recognition processing component;
    wherein the system further comprises a third device;
    wherein the second device further includes means for providing the result output to the third device; and
    wherein the third device comprises means for providing output representing the result output to the user.

20. The system of claim 19:
    wherein the third device comprises a terminal services client;
    wherein the means for providing the result output to the third device comprises a terminal session manager in the second device; and
    wherein the terminal services client comprises the means for providing output representing the result output to the user.

21. The system of claim 20, further comprising:
    an audio capture device comprising means for capturing the speech of the user, means for producing the audio signal representing the speech of the user, and means for transmitting the audio signal to the audio capture component over a network connection.

22. The system of claim 21, wherein the audio capture device is not connected to the third device.

23. The system of claim 20, wherein the second device further includes the speech recognition processing component.

24. The system of claim 20, further comprising a third device, wherein the third device includes the speech recognition processing component.

25. The system of claim 1, wherein the result processing component further comprises:
- means for providing the result output to an application;
- means for obtaining data representing a state of the application; and
- means for providing the data representing the state of the application to the speech recognition processing component.

26. The system of claim 25, wherein the speech recognition processing component further comprises:
- means for receiving the data representing the state of the application; and
- means for changing a speech recognition context of the speech recognition processing component based on the state of the application.

27. The system of claim 26, wherein the means for changing the speech recognition context comprises means for changing a language model of the speech recognition processing component.

28. The system of claim 26, wherein the means for changing the speech recognition context comprises means for changing an acoustic model of the speech recognition processing component.

29. The system of claim 1, wherein the means for performing automatic speech recognition comprises means for performing automatic speech recognition on the captured audio signal to produce the speech recognition results in real-time.

30. A method, for use with a system, the method performed by at least one processor executing computer program instructions stored on a non-transitory computer-readable medium:
wherein the system comprises:
- a first device including an audio capture component;
- a speech recognition processing component; and
- a second device including a result processing component;

wherein the method comprises:
- (A) using the audio capture component to capture an audio signal representing speech of a user to produce a captured audio signal;
- (B) using the speech recognition processing component to perform automatic speech recognition on the captured audio signal to produce speech recognition results;
- (C) determining that the result processing component is associated with a current context of the user, comprising:
  - a. identifying a list of at least one result processing component currently authorized for use on behalf of the user; and
  - b. determining that the at least one result processing component in the list is associated with the current context of the user;
- (D) in response to the determination that the result processing component is associated with the current context of the user, providing the speech recognition results to the result processing component; and
- (E) using the result processing component to process the speech recognition results to produce result output.

31. The method of claim 30, further comprising:
(F) providing the speech recognition results to the result processing component in response to the determination that the result processing component is associated with the current context of the user.

32. The method of claim 30, wherein the system further comprises a context sharing component, and wherein the context sharing component performs (C) and (D).

33. The method of claim 30, wherein the speech recognition processing component performs (D).

34. The method of claim 30, wherein (C) comprises determining at run-time that the result processing component is associated with the user.

35. The method of claim 30, wherein (D) comprises providing the speech recognition results to the result processing component in real-time.

36. The method of claim 30:
wherein the system further comprises:
- an audio capture device coupled to the first device; and
wherein the method further comprises using the audio capture device to:
- (F) capture the speech of the user;
- (G) produce the audio signal representing the speech of the user;
- (H) providing the audio signal to the audio capture component; and
wherein the first device does not include the speech recognition processing component.

37. The method of claim 36, further comprising:
(I) using the first device transmit the captured audio signal to the speech recognition processing component over a network connection.

38. The method of claim 30, wherein the second device further includes a terminal session manager.

39. The method of claim 38, wherein the second device further includes the speech recognition processing component.

40. The method of claim 38, wherein the first device further comprises a terminal services client, wherein the method further comprises:
(F) using the terminal services client to establish a terminal services connection with the terminal session manager.

41. The method of claim 38, further comprising a third device, wherein the third device includes the speech recognition processing component, and wherein the third device does not include a terminal session manager.

42. The method of claim 30, wherein the second device further includes the speech recognition processing component.

43. The method of claim 30, further comprising a third device, wherein the third device includes the speech recognition processing component.

44. The method of claim 30, wherein the first device comprises a logical device.

45. The method of claim 30, wherein the first device comprises a physical device.

46. The method of claim 30, wherein the second device comprises a logical device.

47. The method of claim 30, wherein the second device comprises a physical device.

48. The method of claim 30:
wherein the first device further comprises the speech recognition processing component;
wherein the system further comprises a third device;
wherein the second device further includes means for providing the result output to the third device; and
wherein the method further comprises:
- (F) using the means for providing the result output to provide the result output to the third device; and
- (G) using the third device to provide output representing the result output to the user.

49. The method of claim 48:
wherein the third device comprises a terminal services client;

wherein the means for providing the result output to the third device comprises a terminal session manager in the second device; and wherein the terminal services client comprises the means for providing output representing the result output to the user.

50. The method of claim 49:
wherein the system further comprises an audio capture device; and wherein the method further comprises using the audio capture device to:
(H) capture the speech of the user;
(I) produce the audio signal representing the speech of the user; and
(J) transmit the audio signal to the audio capture component over a network connection.

51. The method of claim 50, wherein the audio capture device is not connected to the third device.

52. The method of claim 49, wherein the second device further includes the speech recognition processing component.

53. The method of claim 49, wherein the system further comprises a third device, and wherein the third device includes the speech recognition processing component.

54. The method of claim 30, further comprising using the result processing component to:
(F) provide the result output to an application;
(G) obtain data representing a state of the application; and
(H) provide the data representing the state of the application to the speech recognition processing component.

55. The method of claim 30, further comprising using the speech recognition processing component to:
(F) receive the data representing the state of the application; and
(G) change a speech recognition context of the speech recognition processing component based on the state of the application.

56. The method of claim 55, wherein (E) comprises changing a language model of the speech recognition processing component.

57. The method of claim 55, wherein (E) comprises changing an acoustic model of the speech recognition processing component.

58. The method of claim 30, wherein (B) comprises performing automatic speech recognition on the captured audio signal to produce the speech recognition results in real-time.

59. A system comprising:
a first machine comprising:
a target application; and
a first result processing component comprising:
means for processing first speech recognition results to produce result output;
means for providing the result output to the target application;
an audio capture device, wherein the first machine does not include the audio capture device; and
a context sharing component comprising means for logically coupling the result processing component to the audio capture device, comprising:
means for identifying a list of at least one result processing component currently authorized for use on behalf of the user, wherein the list includes the first result processing component; and
means for logically coupling each result processing component in the list, including the first result processing component, to the audio capture device.

60. The system of claim 59, wherein the audio capture device comprises a telephone.

61. A computer-implemented method for use with a system:
the system comprising:
a first machine comprising:
a target application; and
a first result processing component comprising:
an audio capture device, wherein the first machine does not include the audio capture device; and
a context sharing component;
wherein the method comprises:
(A) using the result processing component to process first speech recognition results to produce result output;
(B) using the result processing component to provide the result output to the target application; and
(C) using the context sharing component to logically couple the result processing component to the audio capture device, comprising:
(C) (1) identifying a list of at least one result processing component currently authorized for use on behalf of the user, wherein the list includes the first result processing component; and
(C) (2) logically coupling each result processing component in the list, including the first result processing component, to the audio capture device.

62. The method of claim 61, wherein the audio capture device comprises a telephone.

* * * * *

UNITED STATES PATENT AND TRADEMARK OFFICE
CERTIFICATE OF CORRECTION

PATENT NO. : 9,082,408 B2  
APPLICATION NO. : 13/491856  
DATED : July 14, 2015  
INVENTOR(S) : Koll et al.

Page 1 of 1

It is certified that error appears in the above-identified patent and that said Letters Patent is hereby corrected as shown below:

Title page, item (56), under "OTHER PUBLICATIONS", in Column 2, Line 1, delete "NatuallySpeaking" and insert -- Naturally Speaking --, therefor.

Specification

In Column 2, Lines 44-56, delete "a first.....................components." and insert the same at Line 43, after "results;", as a continuation paragraph.

In Column 4, Line 48, delete "computer 100c" and insert -- computer 110c --, therefor.

In Column 5, Line 7, delete "computer 100a" and insert -- computer 110a --, therefor.

In Column 5, Line 22, delete "computer 100a" and insert -- computer 110a --, therefor.

In Column 8, Line 3, delete "component 250." and insert -- component 220. --, therefor.

Signed and Sealed this  
Tenth Day of May, 2016

Michelle K. Lee  
*Director of the United States Patent and Trademark Office*